June 25, 1968     E. HENRY-BIABAUD     3,389,766
HYDRAULIC SHOCK ABSORBERS WITH COMMUNICATION SLIDE-VALVES
Filed Dec. 1, 1966     2 Sheets-Sheet 2
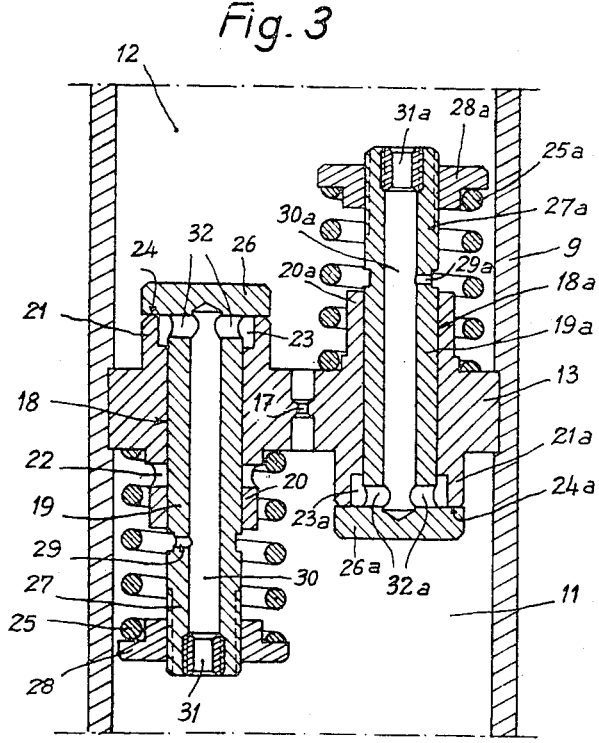
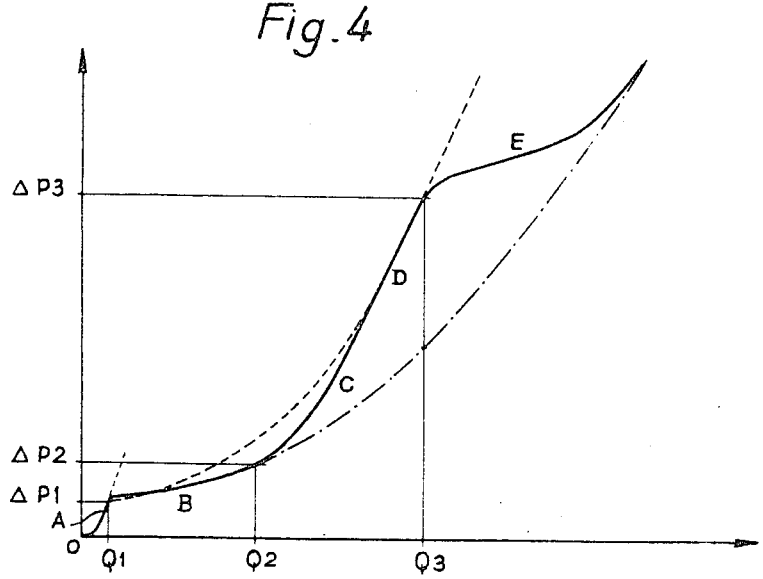

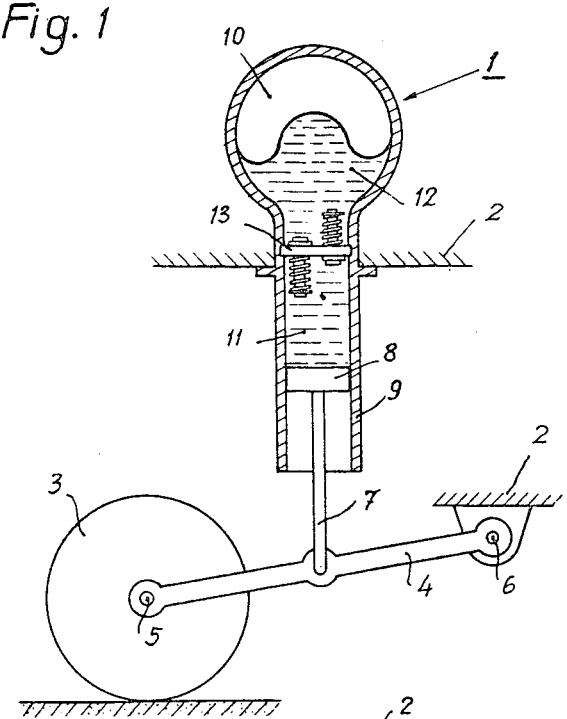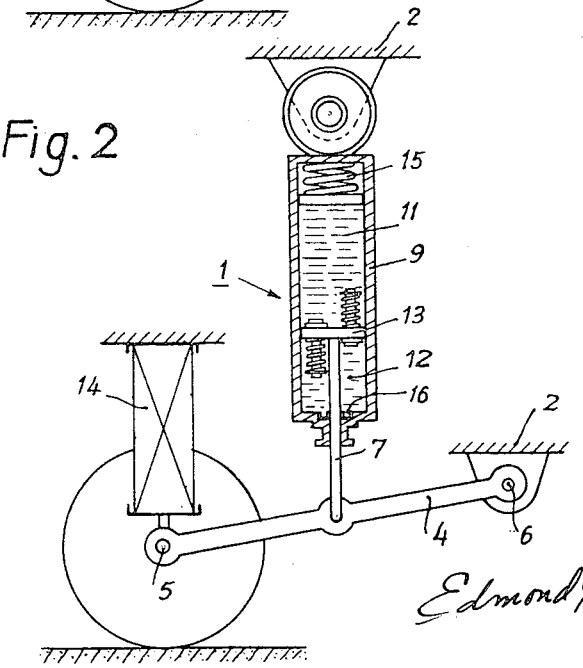

United States Patent Office 3,389,766
Patented June 25, 1968

3,389,766
HYDRAULIC SHOCK ABSORBERS WITH
COMMUNICATION SLIDE-VALVES
Edmond Henry-Biabaud, Paris, France, assignor to Societe
Anonyme Andre Citroen, Paris, France, a corporation
of France
Filed Dec. 1, 1966, Ser. No. 598,350
Claims priority, application France, Dec. 7, 1965,
41,264, Patent 1,467,818
3 Claims. (Cl. 188—88)

ABSTRACT OF THE DISCLOSURE

A hydraulic shock absorber wherein two compartments are filled with a fluid and are separated by means of a partition. On the partition two valves are mounted operable in opposite directions. Each valve comprises a rod sliding in a guide cylinder and the rod is pierced longitudinally with a conduit opening into the compartment located at the open end of the rod. Transverse holes of two kinds are provided in the rods. The first kind connects the longitudinal conduit to the compartment located on the side of the valve head when the valve is lifted and the second connects the conduit to the compartment located on the side of the free extremity of the rod when the lift of the valve is less than a predetermined value. At least one hole of the second kind forms a supplementary passage which is closed by means of the lateral wall of the guide cylinder for the rod when the lift of the valve is lower than a predetermined value.

---

In order to increase the comfort of vehicles, it becomes necessary to provide suspension systems having great flexibility. This type of suspension necessitates a study of the laws of absorption of shocks different from those applied in the case of conventional suspension systems, if it is desired to reduce the risk of suspension jolts which may occur when passing over ridges or holes in the road. When the speed of oscillation of the wheels is large, the resistance forces introduced by means of a conventional shock-absorber, for example hydraulic, do not in fact sufficiently correspond to the ideal damping curve, even if the value of the pressure loss caused in the damping liquid is varied as a parabolic function of the value of the speed of circulation of this liquid, instead of being a linear function of the value of that speed.

The present invention has for its object to remedy this drawback.

It has for its object a hydraulic shock-absorber of the type comprising two compartments separated by means of a partition, this shock-absorber being essentially characterized in that its separation partition comprises at least one valve which puts the two compartments into communication as soon as it is lifted, and the rod of which, constituting a slide-valve, closes and then re-opens at least one additional passage between the two compartments, for pre-determined values of lift of the said valve.

In this case, the shock-absorber according to the invention remains flexible for a wheel movement at low speed in the direction of opening of the valve, the circulation of fluid between the two compartments being small and the valve being scarcely lifted.

At high speeds of oscillation of the wheels on the other hand, when passing over an abrupt change in level, such as a pronounced ridge or a hole in the road for example, the shock-absorber according to the invention becomes hard in the direction indicated above, permitting, if this direction corresponds to compression of the suspension, the shocks of the body or the chassis against the part of the vehicle coupled directly to the wheels to be avoided.

Communication between the two compartments can finally be re-established for safety purposes, so as to avoid the inception of excessive fluid pressures, in the case of very high speeds of oscillation corresponding for example to the passage of the vehicle over so-called "pot holes" on a road in a bad state of repair.

Other characteristic features of the invention will become apparent during the course of the description which follows below of one of its forms of embodiment comprising two valves, given as an example and illustrated in the accompanying drawings.

In these drawings:

FIG. 1 is a view, partly in elevation and partly in cross-section of the shock-absorber according to the invention, incorporated in the suspension of a vehicle;

FIG. 2 illustrates an alternative form of the device shown in FIG. 1;

FIG. 3 is a view in cross-section of the partition of the shock-absorber shown in FIG. 1;

FIG. 4 shows in the form of a curve, the variation of the difference in pressures existing inside the two compartments as a function of the rate of flow of fluid passing through the separation partition.

Referring now to FIG. 1 of the drawings, it is seen that the shock-absorber according to the invention can be incorporated in a device 1, oleo-pneumatic for example, fixed on a body or chassis 2 and serving to suspend a wheel 3 of an automobile vehicle or the like. A crank-arm 4, articulated on the shaft 5 of the wheel, and pivotally mounted on the body by means of a shaft 6, actuates a piston 8 sliding in a cylinder 9 by means of a rod 7. This cylinder is filled with a fluid and is put under pressure by means of a compressed gas 10, the cylinder being divided into two compartments 11 and 12 by means of a fixed separation partition 13.

When the suspension comprises an elastic element 14, spring or compressed air, the shock-absorber can be separate and can be mounted in the usual manner between the wheel support and the chassis. The rod 7 is then fixed to the separation partition 13 which then constitutes the piston of the shock-absorber. The rod 7 passes through the bottom of the cylinder 9 by means of a sealing joint 16, and the fluid contained in the shock-absorber is put under initial pressure balanced by the spring 15; this arrangement ensures the maintenance of the pressure in known manner during variations of internal volume caused by the variable length of the rod 7 introduced into the shock-absorber.

Whether it is fixed or movable, the partition 13 is pierced, in order to permit circulation of fluid between the two compartments 11 and 12, with a calibrated orifice 17 (see FIG. 3) and openings 18 and 18a arranged in such manner as to receive the valves 19 and 19a disposed in directions opposite to each other. To this end, the walls of the openings 18 and 18a are extended by means of guiding members 20 and 20a, 21 and 21a, which are preferably formed integral with the partition 13, the member 20 being pierced with at least one hole 22 and the members 21 and 21a widening out respectively towards the top and towards the bottom so as to constitute chambers 23 and 23a.

On the upper and lower edges 24 and 24a of the members 21 and 21a which serve as seatings, there are applied by means of restoring springs 25 and 25a, the heads 26 and 26a of the valves 19 and 19a, the rods 27 and 27a of these valves sliding in the openings 18 and 18a, and in the said guiding members 20 and 20a, 21 and 21a. These rods, provided with ferrules 28 and 28a serving as supports for the springs 25 and 25a are pierced with holes 29 and 29a passing through their lateral walls and opening into longitudinal conduits 30 and 30a of the rods, these conduits being in communication with the compartments 11 or 12 by means of calibrated orifices 31 or 31a and with the chambers 23 and 23a, through the intermediary of holes 32 and 32a.

It should furthermore be observed that the valves 19 and 19a lift when the values of flow-rate of fluid and of the loss of pressure of this fluid are respectively equal to $Q_1$ and to $\Delta P_1$. In addition, the holes 29 and 29a remain entirely open, without being closed by the members 20 and 20a, by reason of the small lift of the valves 19 and 19a if the respective values of the flow-rate and of the pressure drop are less than $Q_2$ and $\Delta P_2$. Finally, the hole 29 is again partly or wholly uncovered, coming opposite the hole 22 pierced in the guide 20 when the values of the flow-rate and pressure drop exceed $Q_3$ and $\Delta P_3$.

In accordance with the invention furthermore, one only of the two valves 19 or 19a can when so desired be pierced with a hole 29 or 29a, which provides an additional communication between the compartments 11 and 12 for small lifts of these valves.

The operation of the unit described above will now be described, it being first assumed that the fluid flows from the compartment 11 towards the compartment 12, the valve 19a being understood to remain always closed.

When its flow-rate is small (arc A of FIG. 4), the fluid passes solely through the calibrated orifice 17, the small pressure drop, equal to the difference in pressures existing in the compartments 11 and 12, being incapable of overcoming the resistance of the opposing spring 25 and of lifting the valve 19.

If the flow-rate assumes a value greater than $Q_1$ (arc B of the curve), the value of the pressure drop at the passage to the orifice 17 is greater than $\Delta P_1$, and the valve 19 lifts, opening additional communication channels between the compartments 11 and 12 by means of the hole 29 and the orifice 31 of the conduit 30 and the chamber 32.

When the values of the flow-rate and the pressure drop respectively exceed $Q_2$ and $\Delta P_2$ (arc C of the curve), the guiding member 20 progressively closes the hole 29 as mentioned above, reducing the section of passage available for the fluid at its entry into the conduit 30, and in consequence rapidly increasing the drop in pressure.

For a sufficient flow-rate and pressure drop (arc D), the guiding member 20 completely covers the hole 29, the compartments 11 and 12 communicating solely by means of the orifice 31 of the conduit 30 and the chamber 23, and of course the orifice 17.

Finally, if the values of the flow-rate and pressure drop are subjected to a further increase, becoming respectively greater than $Q_3$ and $\Delta P_3$ (arc E), the hole 29 is gradually brought opposite the hole 22, as already explained above, thus increasing the sections of passage available for the fluid at its entry to the conduit 30, and thus preventing any excessively rapid increase of the pressure drop as a function of the flow-rate.

It will in fact be observed that the distance between the upper edges of the holes 22 and 29 being equal to the distance between the lower edge of the guiding member 20 and the upper edge of the ferrule 28, the lateral wall of the opening 18 cannot consequently again cover the hole 28, even partially, during a maximum compression of the spring 25.

Furthermore, when the fluid flows from the compartment 12 to the compartment 11, the valve 19 being then always closed, a curve showing the variation of the pressure drop as a function of the flow-rate of fluid will again comprise a succession of arcs A, B, C and D similar to those shown in FIG. 4. As no hole has been pierced in the lateral wall of the guiding member 20a, there is no arc E in this case, the maximum value of the pressure drop being moreover equal to the value of the pressure applied by means of the compressed gas 10 on the fluid contained in the cylinder 9. If the conditions of use of the shock-absorber rendered this necessary, there could also be provided a peak-limiting hole 22a (not shown).

As will be readily understood by referring to FIGS. 1 and 2 of the drawings, the value of the flow-rate of fluid passing from the compartment 11 into the compartment 12, or from the compartment 12 into the compartment 11, becomes higher as the wheel 3 approaches or moves away more rapidly from the body 2 during the course of the oscillations and shocks caused by the running of the vehicle. It follows that the shock absorption due to the device according to the invention, which is small when the speeds of oscillation of the wheels 3 are small (arc B of FIG. 4), becomes very large when the speeds of oscillation are high (arc D of FIG. 4), the increase of this damping being limited, during the compression of the suspension 1, by means of the progressive coming into line of the holes 22 and 29 (arc E of FIG. 4).

Finally, it will be noted that the very small oscillations of the vehicle are damped by means of the calibrated orifice 17 provided in the partition 13 which separates the compartments 11 and 12 (arc A of FIG. 4).

It will of course be understood that the form of embodiment described above is not of any limitative nature and may be given any desired modifications, without thereby departing from the scope of the invention.

What is claimed is:

1. A hydraulic shock-absorber of the type comprising two compartments filled with a fluid and separated by means of a partition for the suspension of an automobile vehicle or the like, said partition having two valves mounted thereon arranged in opposite direction to each other comprising each a rod sliding in a guide cylinder having lateral walls formed integrally with said partition, said rod having a free extremity and a head portion, said rod being pierced longitudinally with a conduit opening into the compartment located on the side of the free extremity of said rod, and having transverse holes of two kinds, the first connecting the longitudinal conduit to the compartment located on the side of the valve head when this valve is lifted, and the second connecting the said conduit to the compartment located on the side of the free extremity of the rod when the lift of the valve is less than a pre-determined value; at least one hole of the second kind constituting a supplementary passage which is closed by means of the lateral wall of said guide cylinder in which slides the rod of the valve, when the lift of said valve is greater than a pre-determined value.

2. A shock-absorber in accordance with claim 1 wherein said transverse hole of the second kind cooperates with an opening formed in the lateral wall of said guide cylinder when the lift of the valve is a maximum.

3. A shock-absorber in accordance with claim 1 wherein said separation partition comprises at least one calibrated orifice forming a continuous passage between said two compartments.

References Cited

UNITED STATES PATENTS

| 2,369,007 | 2/1945 | Beecher | 188—88 |
| 2,807,336 | 9/1957 | Sweeney | 188—88 X |
| 2,934,175 | 4/1960 | Schnitzer | 188—88 X |

FOREIGN PATENTS 647,296   12/1950   Great Britain.

MILTON BUCHLER, *Primary Examiner.*

G. E. A. HALVOSA, *Examiner.*